US006757235B2

(12) United States Patent
Wickramasinghe et al.

(10) Patent No.: US 6,757,235 B2
(45) Date of Patent: Jun. 29, 2004

(54) ASSEMBLY SUITABLE FOR READING DATA BASED ON THERMAL COUPLING

(75) Inventors: Hemantha Kumar Wickramasinghe, Chappaqua, NY (US); Hendrik F. Hamann, Mohegan Lake, NY (US); Yves Martin, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 09/774,851

(22) Filed: Jan. 31, 2001

(65) Prior Publication Data

US 2002/0101812 A1 Aug. 1, 2002

(51) Int. Cl.⁷ .................................................. G11B 7/00
(52) U.S. Cl. ..................... 369/99; 369/126; 369/13.33
(58) Field of Search .............................. 369/13.33, 126, 369/44.12, 99; 219/216, 388, 510

(56) References Cited

U.S. PATENT DOCUMENTS 6,069,853 A * 5/2000 Novotny et al. ......... 369/13.33

* cited by examiner

Primary Examiner—Nabil Hindi
(74) Attorney, Agent, or Firm—Stephen C Kaufman

(57) ABSTRACT

An assembly suitable for reading data based on thermal coupling. The assembly can realize resolution/density specifications that can transcend diffraction limited focused laser beam techniques. The assembly includes a temperature sensor supported by a head-like structure, the temperature sensor capable of monitoring thermal coupling between the sensor and a media, and a heater element for heating the temperature sensor. A controller is used for coordinating a mutual positioning of the head-like structure and the media so that changes of thermal coupling between the assembly and a media provide indicia of a media bit pattern.

12 Claims, 7 Drawing Sheets

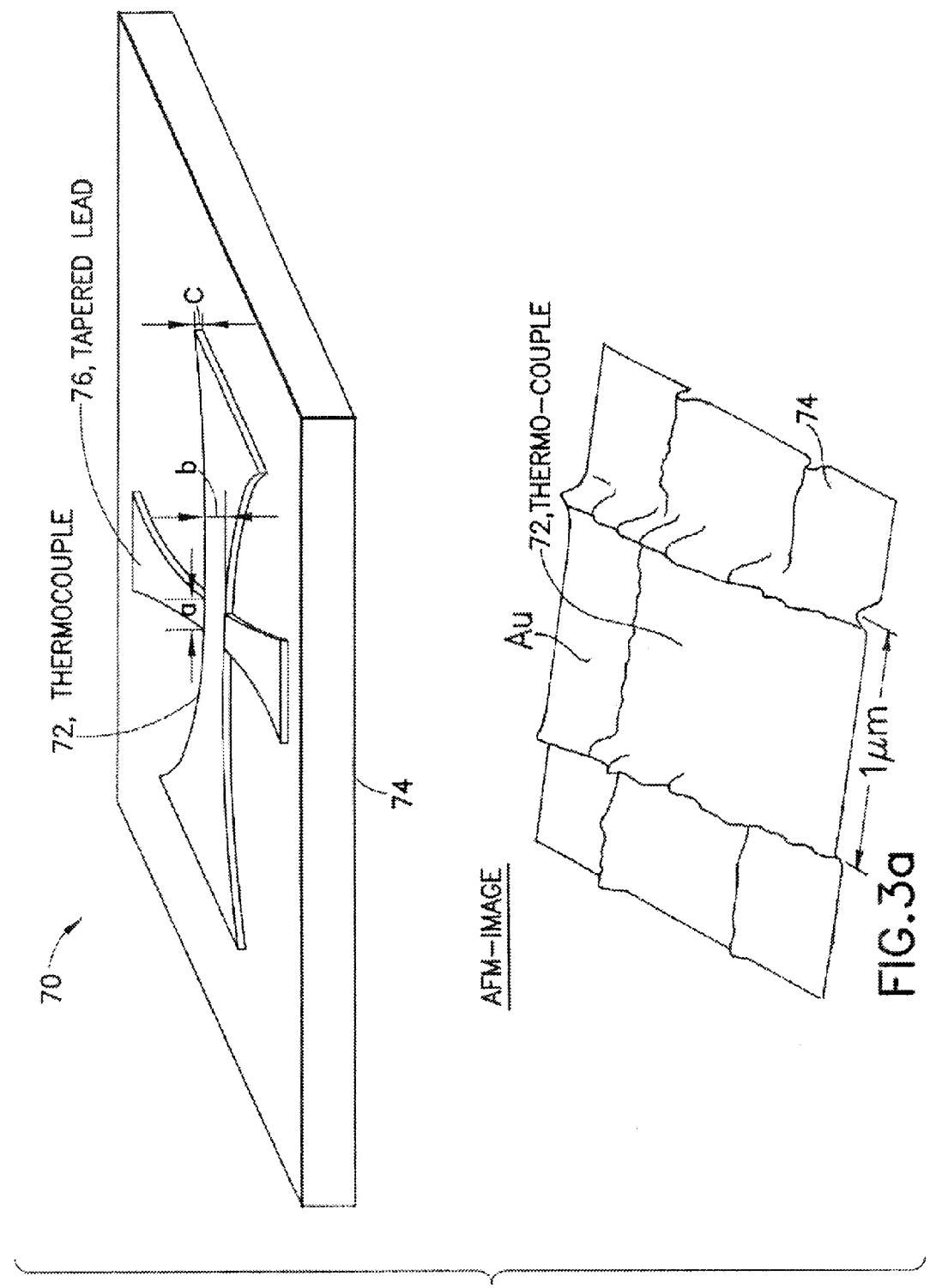

ASSEMBLY SUITABLE FOR READING DATA BASED ON THERMAL COUPLING

CROSS-REFERENCE TO RELATED APPLICATIONS

The instant application is related to U.S. application Ser. No. 09/408,946, filed Sep. 30, 1999 by Wickramasinghe et al. (IBM docket YO999-443); and, to U.S. application Ser. No. 09/427,169, filed Oct. 26, 1999 by Hamann et al. (IBM docket YO999-504); and, to U.S. application Ser. No. 09/512,248, filed Feb. 24, 2000 by Hamann et al. (IBM docket YOR9-2000-0099); and to U.S. application Ser. No. 09/540,726 filed Mar. 31, 2000 by Hamann et al. (IBM docket YOR9-2000-0180); and, to U.S. application Ser. No. 09/559,489, filed Apr. 27, 2000 by Hamann et al. (IBM docket YOR9-2000-0215); and to the following contemporaneously filed U.S. applications, namely, Ser. No. 09/774,851 filed Jan. 31, 2001 by Wickramasinghe et al. (IBM docket YOR920010062); and, to U.S. application Ser. No. 09/774,943, filed Jan. 31, 2001 by Wickramasinghe et al. (IBM docket YOR920010113); and, to U.S. application Ser. No. 09/773,323, filed Jan. 31, 2001 by Wickramasinghe et al. (IBM docket YOR920010114). All of these applications are co-pending, commonly assigned, and incorporated by reference herein.

FIELD OF THE INVENTION

This invention relates to a novel assembly suitable for reading data based on thermal coupling between the assembly and a storage media.

INTRODUCTION TO THE INVENTION

Techniques capable of reading information on a storage media are known. For example, in optical storage technology, a bit pattern may be realized by crystalline (high conductivity and reflectivity) and amorphous (low conductivity and reflectivity) regions on a phase-change media, wherein bit pattern data may be read back by monitoring a change in reflectance of a focused laser beam.

SUMMARY OF THE INVENTION

Our work includes a critique and an evaluation of the capabilities of important and representative reading methods of the type represented by the optical storage technology.

To this end, we first note that an important motivation for efforts in this field is to provide insight and capability so that reading of bit pattern data may be realized at ever-increasing high densities—for example, reading at densities larger than 1 Gbit/in$^2$. However, we note that for the case of the representative optical storage technology, the resolution of a focused laser beam is restricted by its wavelength to $\approx \lambda/2$ ($\lambda$ is the wavelength of the laser), so that the potential data densities of such devices are accordingly severely limited.

The present invention discloses a novel reading assembly capable of reading information on a storage media at high speed and at a resolution which can qualitatively and profoundly transcend the delimitation of the focused laser beam $\approx \lambda/2$ constraint. For example, the novel assembly of the present invention can provide a capability for reading information on a storage media, e.g., a phase-change media, at high speed (e.g., greater than 0.01 MHz, illustratively 100 MHz) and, at a resolution such that there are storage densities larger than 1 Gbit/in$^2$.

The novel assembly of the present invention can realize these important advantages by controlling and monitoring changes of thermal coupling between the reading assembly and the media, preferably as a near-field thermal coupling. In particular, bit pattern data may comprise a first region which can couple thermally strongly with a reading head (i.e., low thermal resistance between media and reader), and, a second region which can couple only weakly with the reading head (i.e., high thermal resistance between media and reader). The novel assembly includes a structure for sensitively monitoring changes of thermal coupling induced between the assembly and such a media, thereby realizing a reader capability.

Accordingly, we now disclose in a first aspect of the present invention, a novel reading assembly, the assembly comprising:

1) a head-like structure;
2) a temperature sensor supported by the head-like structure, the temperature sensor capable of monitoring thermal coupling between the sensor and a media;
3) a heater element for heating the temperature sensor; and
4) a controller for coordinating a mutual positioning of the head-like structure and a media.

In a second aspect of the present invention, we disclose a novel reading assembly comprising:

1) a head-like structure;
2) a temperature sensor supported by the head-like structure;
3) a temperature transducer supported by the head-like structure and comprising input to the temperature sensor; and
4) a controller for coordinating a mutual positioning of the head-like structure and a media;

the assembly providing a reading capability as the temperature transducer induces a temperature differential between the media and the temperature sensor, thereby developing an information reading signal.

The second aspect of the present invention makes explicit that what is required to develop an appropriate information reading signal may be manifest by providing a temperature differential between the media and the temperature sensor. In particular, the temperature differential may be developed by inter alia heating the media by way of the temperature transducer and abstracting the information signal by a cooler temperature sensor, or, secondly, cooling the media by way of the temperature transducer and abstracting the information signal by a relatively hotter temperature sensor.

BRIEF DESCRIPTION OF THE DRAWING

The invention is illustrated in the accompanying drawing (not drawn to scale), in which:

FIGS. 3a and 3b provide examples of a temperature sensor included in the FIG. 1 generalized assembly;

DETAILED DESCRIPTION OF THE INVENTION

Overview of the Assembly

Figure 1:
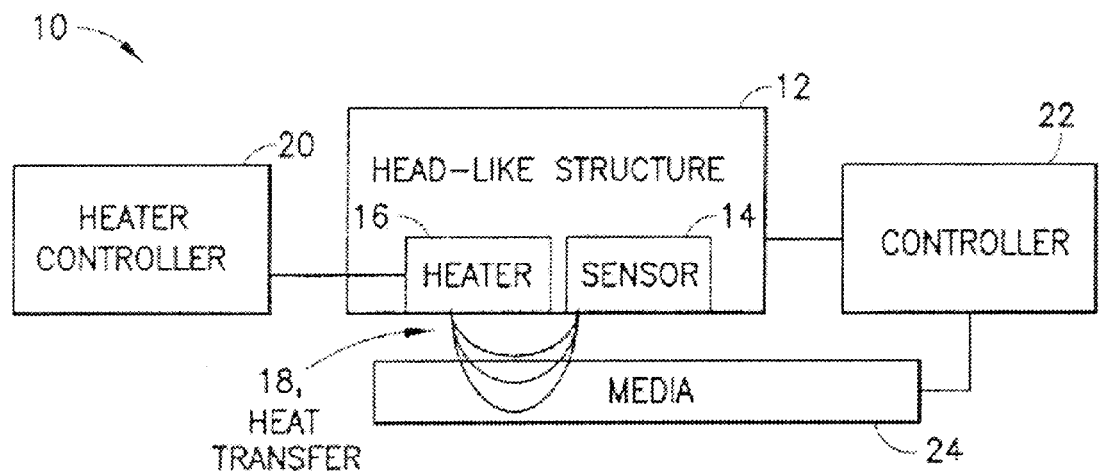
FIG. 1 shows a generalized assembly of the present invention.

Attention is first directed to FIG. 1, which shows a generalized reading apparatus (10) of the present invention. In particular, the assembly (10) preferably comprises the following elements:

a head-like structure (12) which can support a heater and a sensor;

a temperature sensor (14) supported by the head-like structure (12), the temperature sensor (14) capable of monitoring thermal coupling between the sensor (14) and a media;

a heater element (16) capable of heating the temperature sensor (14);

at least one mechanism (18) capable of transferring energy from the temperature sensor (14) to a media;

a first controller (20), for example, a current supply, for the heater element (16);

a second controller (22) for coordinating a mutual positioning of the head-like structure (12) and a media; and a media (24) comprising bit pattern data.

The reader is asked to keep in the back of his mind the illustrative referent FIG. 1 assembly (10), as we now turn our attention to unfolding particulars and alternative embodiments of the elements subsumed by the FIG. 1 assembly (10).

Head-Like-Structure

The temperature sensor (14) as well as the heater element (16) preferably are mounted to the head-like structure (12), which represents an assembly reader. The purpose of this structure (12) can be threefold:

(1) it can serve as a support for the heater (16) and temperature sensor (14);

(2) the thermal properties of the head (12) can be used in order to increase the signal of the reader as well as to control the diffusion of heat (i.e., the reading speed);

(3) the head structure (12) may include (in analogy to magnetic storage) an air-bearing surface so that it can be flown over a media disc at a very close distance.

Figure 2A:
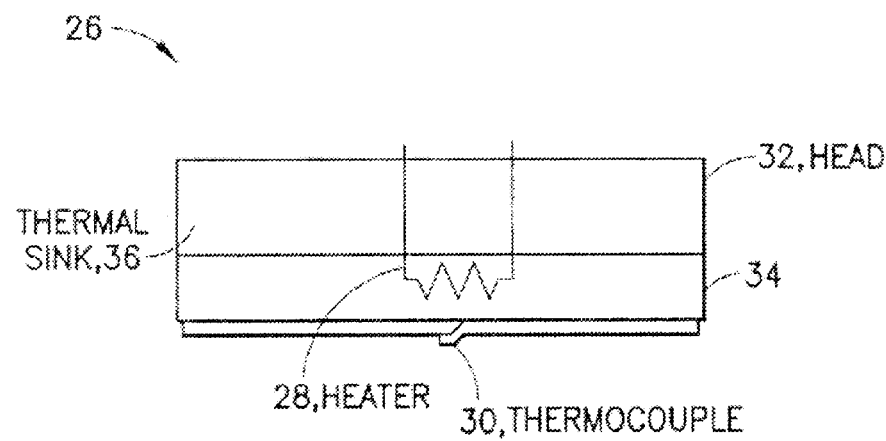
FIGS. 2a, 2b, 2c and 2d provide examples for assembly readers including the head-like structure of the FIG. 1 generalized assembly.

FIGS. 2a–d show different examples for a reader assembly in a head-like structure (12). FIG. 2a shows an assembly reader (26), where a small resistive heater (28) is mounted below a thermocouple (30) in a reading head (32). In order to improve the sensitivity of the assembly reader (26), a low heat conducting layer (34, e.g., glass) may separate the thermocouple (30) and heater (28), which may be mounted on a high heat conducting sink (36, e.g., diamond, silicon). The idea of the layer (34) is to increase the thermal resistance between heater (28) and thermocouple (30), which may increase the signal in the case of the loading by the media (24). The layer (34) may be also used for electrical insulation purposes. As an example for such a reader (26), we consider a heater element (28) with the dimensions of $\approx 20\times 20\times 20$ nm$^3$ mounted directly under a thermocouple (30) with similar dimensions. The head (32) material may be a low conducting glass ($\approx 0.5$ W/mK). Finite element thermal modeling calculations show that for a power of $\approx 70$ $\mu$W (dissipated in the heater (28)) the thermocouple (30) temperature is raised up to $\approx 250°$ C. A thermal loading of 2 $\mu$W by the media (which is a typical thermal near-field power flow for $20\times 20$ nm$^2$ area) can change the thermocouple (30) temperature down to 230° C., which results for a typical thermocouple gain of $\approx 50$ $\mu$V/K to a signal of $\approx 1$ mV. Assuming a noise level of $\approx 3$ nV/Hz$^{0.5}$ a signal to noise ratio of SNR>20 dB in 100 MHz reading bandwidth can be accomplished.

Figure 2B:
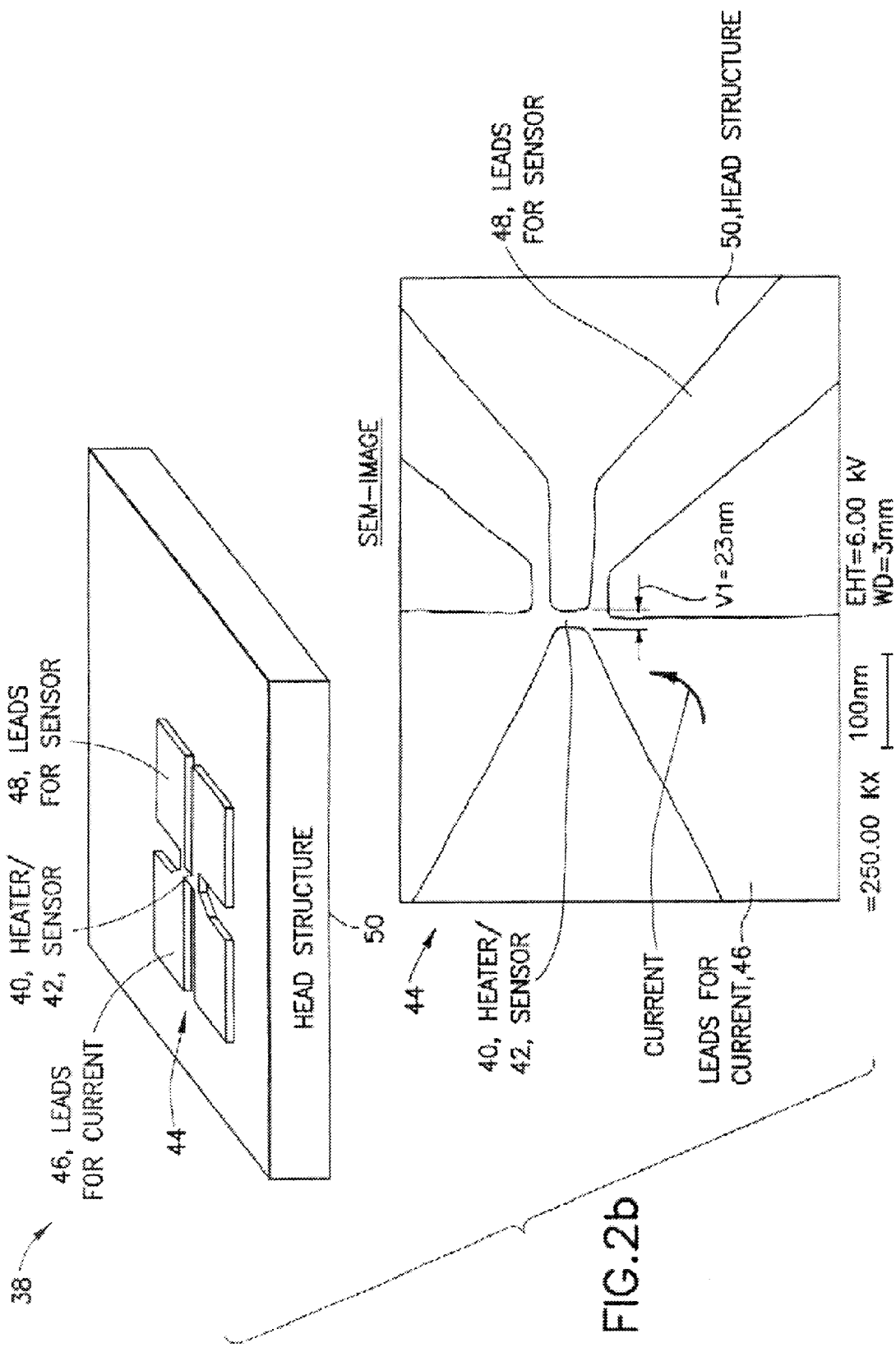

FIG. 2b shows an assembly reader (38), where a heater (40) and a temperature sensor (42) are the same and may be realized in a single four terminal device (44). The large leads (46) can supply the current for Joule heating the heater (40)/sensor (42). The temperature of the heater (40) can be monitored by measuring the voltage drop across the resistor sensor (42) using sensor leads (48). If the thermal coupling between resistor and media is strong, additional power is drawn out of the resistor, which decreases its temperature. Consequently, the electrical resistance of (42) is lowered, which can be monitored as a voltage change. In addition, the lowered resistance decreases the amount of dissipated electrical power at a constant current. Typically, the four terminal arrangement (44) is preferably imbedded in a head structure (50), which has preferably low heat conductivity (e.g, glass). As an example, the SEM-image in FIG. 2b shows such an assembly reader, which has been made by e-beam lithography. Neglecting heat dissipation in the leads and simulating the device as a single resistor, the performance of such an assembly reader (38) can be simply estimated given:

(1) the resistance of the heater (40)/sensor (42) element at room temperature ($R_o$);

(2) the temperature dependence of the heater (40)/sensor (42) element ($R(T)=R_o(1+\alpha T)$);

(3) the power($P_t$) flowing to the media (24) in the case of strong thermal coupling; and (4) the thermal gain ($M_l=[K/W]$) of the reader assembly (38), which allows one to calculate the temperature increase as a function of the power ($T=M_l$ P) in the resistor.

$M_l$ depends strongly on the thermal properties (e.g., thermal conductivities) as well as dimensions and geometry of the head structure (50). Simple considerations yield for the voltage change dV in a first order approximation $$dV \approx -R_o\ I\ \alpha\ M_l\ P_t/(1-R_o\ I^2\ \alpha\ M_l),$$

where I is the current supplied by the heater. As an example, $\alpha=1/273$ K, $M_l=1$ K/$\mu$W (SiO$_2$ substrate), $R_o=100\Omega$, $P_t=2$ $\mu$W (typical near-field power flow for $20\times 20$ nm$^2$) and I=1 mA results in a voltage change of dV$\approx -1.1$ mV. Considering an amplifier noise comprising Johnson noise of $\approx 3$ nV/Hz$^{0.5}$ and neglecting shot-noise contributions due to the supplied current a signal to noise ratio of SNR>20 dB in 100 MHz can be obtained. The power dissipated in the heater is then 157.8 $\mu$W and 156.6 $\mu$W, corresponding to 157.8$\Omega$ and 156.6$\Omega$ and 157.8° C. and 156.6° C. without and with the thermal coupling, respectively. The situation can be greatly improved by increasing the thermal power gain ($M_l$) (e.g., in practice the head material would have a lower heat conductivity). For example, with $M_l=5$ K/$\mu$W similar signal levels could be obtained with almost one order of magnitude less power flow ($P_t$). It should be noted that the further increase of the thermal gain ($M_l$) may be limited by shot-noise constraints (i.e., less current is supplied, which shows a larger fractional shot-noise limit) as well as speed considerations. However, as far as it concerns the reading speed, for the cases discussed above, simple thermal diffusion considerations demonstrate that data rates much larger than 100 MHz can be accomplished. Specifically, diffusitivities ($\kappa$) as low as $\kappa\approx 4\cdot 10^{-8}$ m$^2$/s can be tolerated considering the small heater dimensions (i.e., 20 nm). By way of comparison, a typical metal exhibits diffusitivities of $\kappa\approx 2\cdot 10^{-5}$ m$^2$/s, while a good thermal insulator such as SiO$_2$ still shows a large enough diffusitivity of $\kappa 9.6\cdot 10^{-7}$ m$^2$/s.

Figure 2C:
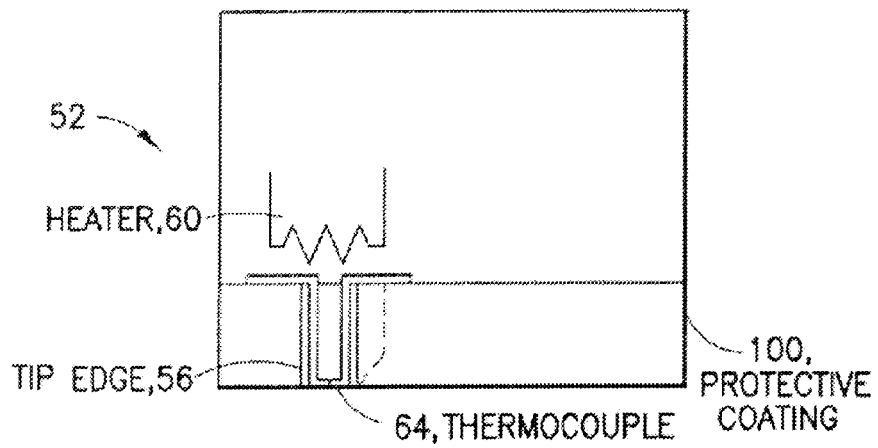
Figure 2D:
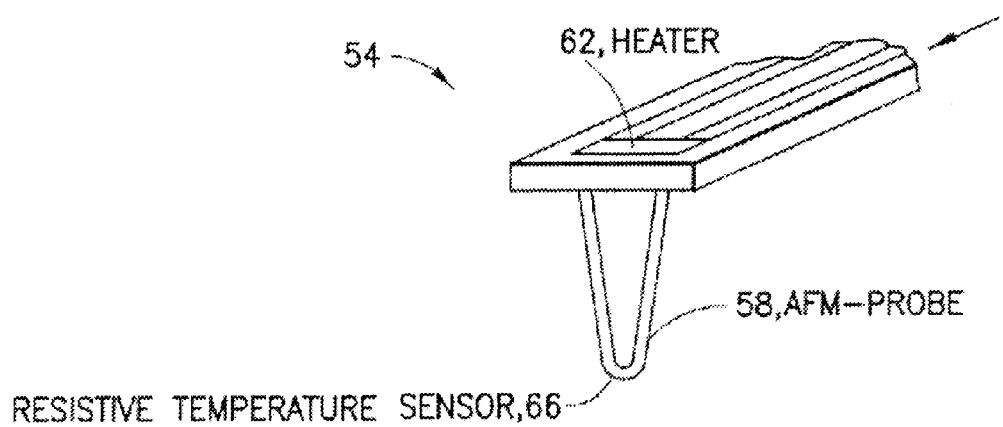

FIG. 2c (52) and d (54) shows assembly readers with the head-type structures where a tip-like element is implemented. In FIG. 2c (52) the tip represents a little edge (56), while in FIG. 2d (54) the tip comprises an AFM-probe (58). The base of these tips may be heated resistively (60) and (62) via Joule heating. At the end of the tips in FIG. 2c (52) a small thermocouple (64) and in FIG. 2d (54) a resistive temperature sensor (66) may be mounted. The main reason for a tip structure is that such an element can easily represent an element of high thermal resistance, which can largely increase the signal of the reading assemblies (52,54). Specifically, if the thermal coupling resistance is actually smaller than the thermal resistance of the tip element, a large loading of the tip end can be observed when the head experiences a large thermal coupling with the media. In this sense, the tip can has the same purpose as the layer (34) between the heater (28) and the temperature sensor (30) in assembly reader (26, FIG. 2a). However, in contrast to the assembly reader (26), it is much easier to realize a high thermal resistor with a tip than with a layer. Finally, as disadvantages for such a tip-based reader, it is noted that a tip with a high thermal resistance may limit the data reading rate and generally tips are fragile. In some cases, the tip may be protected by embedding it into a very low heat conducting material (68).

Temperature Sensor Element

One purpose of the temperature sensor (14) is to monitor the thermal loading by the media (24) at high resolution.

The temperature sensor (14) can be any kind of temperature sensing element comprising thermocouples, thermistors with negative and positive temperature coefficient of resistance (NTC, PTC) or any other resistance temperature sensors. As an example, good thermocouples may include Fe/Constantan ($\approx$50 $\mu$V/K), Chromel/Alumel ($\approx$40 $\mu$V/K), Cu/Constantan ($\approx$40 $\mu$V/K), Ni/Fe ($\approx$40 $\mu$V/K), Bi/Sb ($\approx$105 $\mu$V/K) or combinations with semiconducting materials, where the differences in the Fermi-levels are fairly large. Typical NTC-thermistors are made of oxides of Mn, Co, and Ni with resistance changes in the $\approx$(2–7) %/K-range. PTC-thermistors consists of Si or some doped polycrystalline ceramics and show resistance changes of $\approx$2%/K. Examples for conventional resistance temperature sensors are devices made of Pt ($\approx$0.385%/K) or Ni ($\approx$0.6645%/K) or Cu ($\approx$0.421%/K).

The design guidelines for the temperature sensor element include the following facts:

(i) the temperature sensor (14) is preferably small, because its dimensions determine the resolution of the assembly reader and thus the potential data densities;

(ii) generally, it is preferred to operate the temperature sensor (14) at higher temperatures, because it may enhance the thermal coupling between sensor (14) and media (24);

(iii) the temperature sensor should be generally in close proximity to the media.

A FIG. 3a assembly (70) shows as an example a small and thin thermocouple (72), preferably with dimensions a, b, c<1000 nm. In contrast to the heater element (16), which is discussed in more detail below, it is preferred to mount the temperature sensor (14)/thermocouple (72) on a low heat conducting material (74, e.g., glass), which can potentially increase the signal. We note that this low heat conducting material (74) may be part of the head-like structure (12). It may be advantageous to taper the leads (76) slightly. The thermocouple (72) consists preferably of materials, which are chemically stable or the thermocouple may be embedded in a protective and chemically inert layer such as $SiO_2$. An AFM-image in FIG. 3a shows an actual thermocouple, which has been built by photolithography in accordance to the ideas of this invention.

Figure 3B:
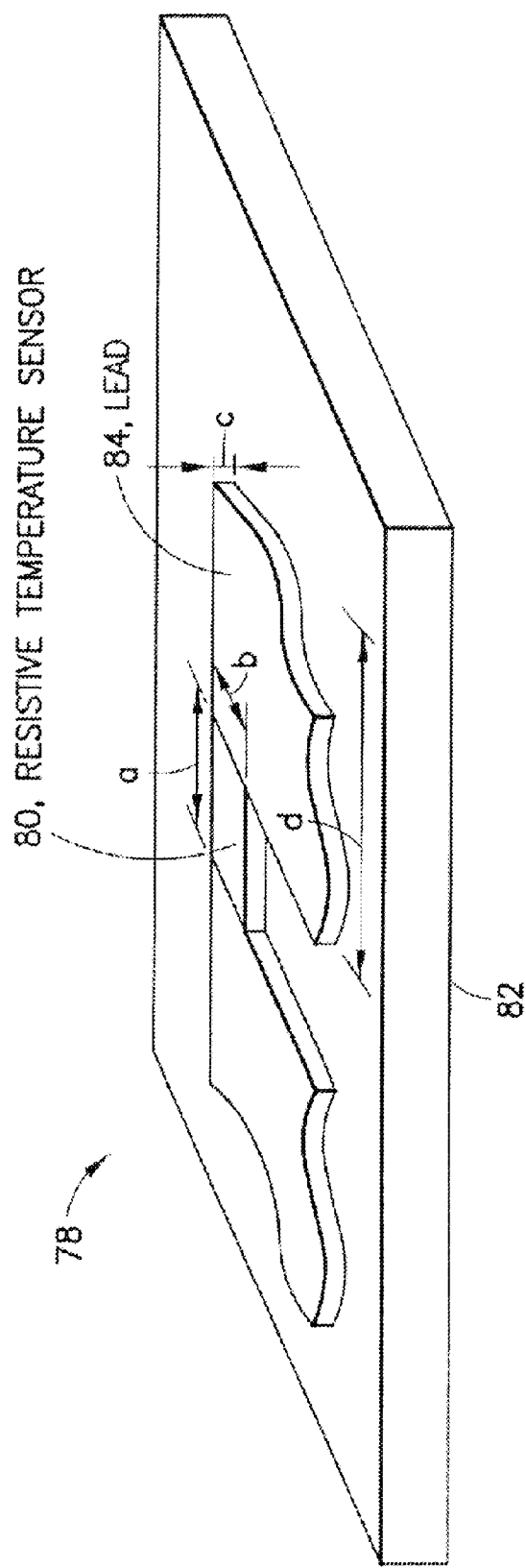

A FIG. 3b assembly (78) illustrates an arrangement, wherein the temperature sensor (14) comprises a resistive element (80), preferably with small dimensions a, b, c<1000 nm. In order to enhance the sensitivity, the resistor (80) is preferably mounted on a low thermal conductive material (82, e.g., glass), which can be part of the head-like structure (12). The leads (84) are preferably large (d>2000 nm) as well as thick (>20 nm) and highly electrically conducting in order to avoid stray resistance.

Heater Element

One purpose of the heater element (16) is to heat the temperature sensor (14).

The heater element (16) can be a resistive heater or any other kind of heating arrangement such as a focused laser. Some general guidelines for building nanoscale heaters can be found in Y0999-443, incorporated by reference herein.

For the purpose of this invention, two guidelines, which are similar to the ones for the temperature sensor (14) may be important for the heater design:

(i) preferably, the heater (16) arrangement provides a very local heating of the temperature sensor (14), and avoids spreading of the heat throughout the head-like structure (12);

(ii) generally, it is preferred to operate the assembly (10) at fairly high temperatures, because this operation may enhance the thermal coupling and consequently increase the signal to noise of the assembly (10).

Figure 4B:
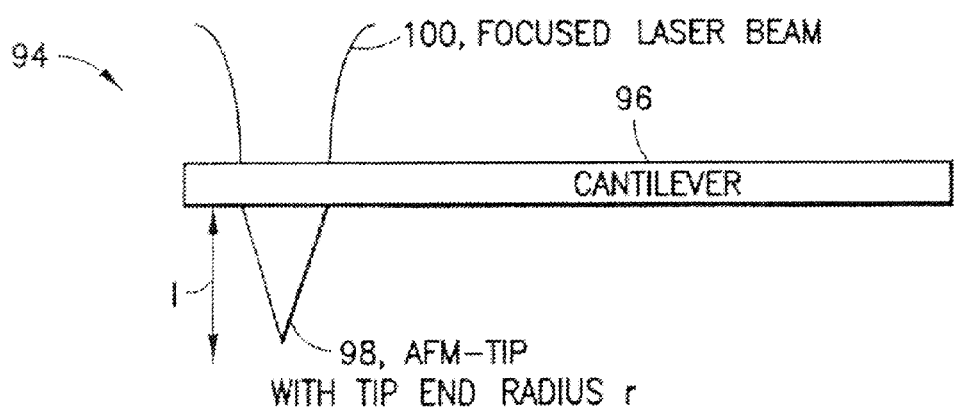
FIGS. 4a and 4b provide examples of a heater element included in the FIG. 1 generalized assembly.
Figure 4A:
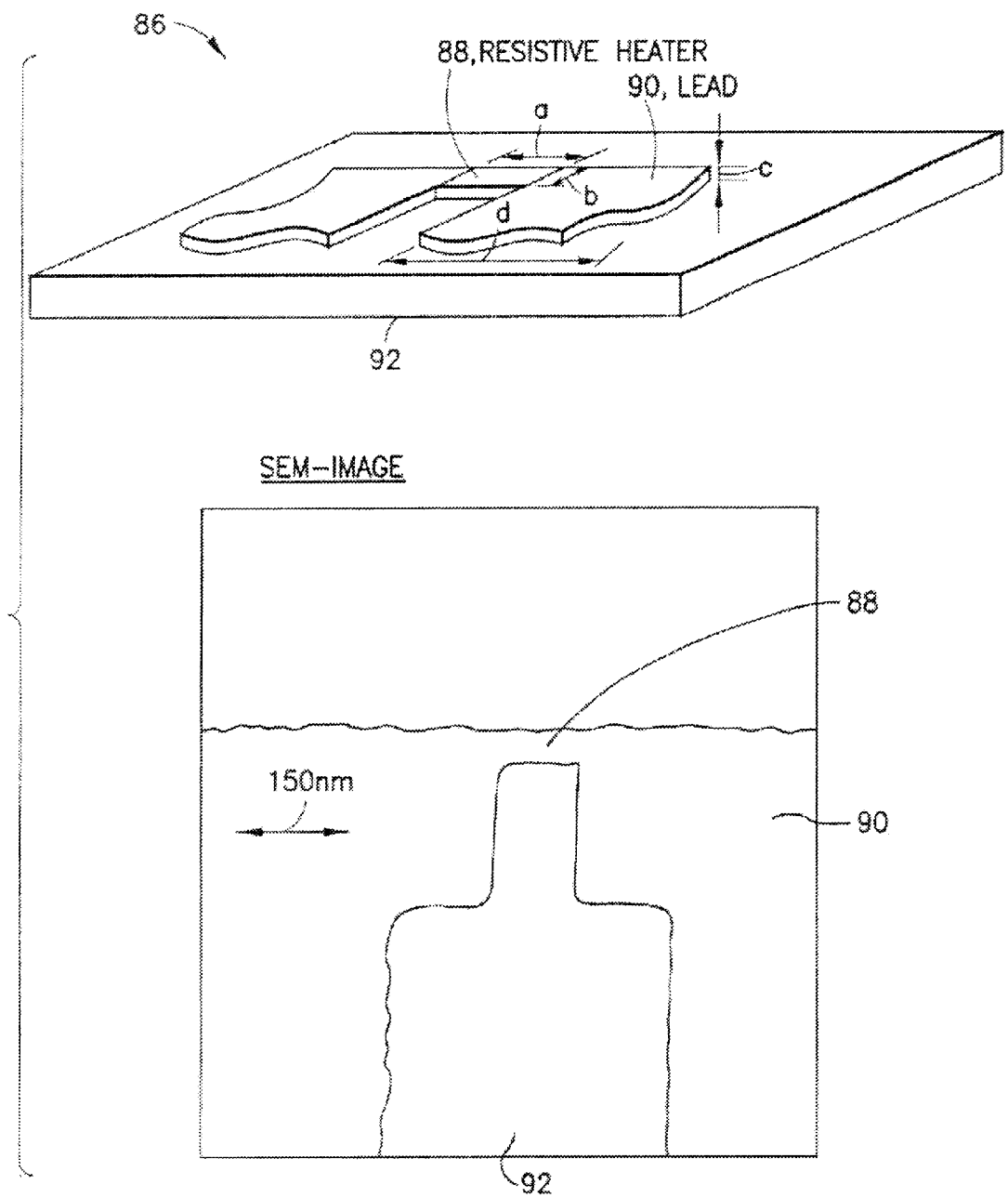

FIG. 4a (numeral 86) shows in analogy with (78, FIG. 3b) a resistive heater (88) with small dimensions (preferably, a, b, c<1000 nm) in combination with preferably large (d>2000 nm) as well as thick (>20 nm) leads (90) with very low electrical resistance. However, contrary to the earlier discussed resistive temperature sensor arrangement (78, FIG. 3b), a good thermal sink material (92) (e.g., diamond, low doped Si etc.) underneath the heater (16) is preferred, which can conduct the heat away and avoid lateral spreading. The thermal sink material (92) typically needs to have a high electrical resistance for insulation purposes. A scanning electron micrograph (SEM) image in FIG. 4a shows an example of a heater (16), which has been built in accordance with these guidelines by focused ion beam (FIB) milling.

Another alternative for providing local heating exploits a geometry such as a tip structure, preferably with a small end radius (e.g., r<100 nm). This tip preferentially conducts the heat to the end of the tip and thus "focuses" the heat. In the FIG. 4b arrangement (94), a cantilever (96) of an atomic force microscope (AFM) tip (98) may be heated by a focused laser beam (100). For high speed application, it may be preferred that the length of the tip l is minimized (e.g., <1 $\mu$m).

Finally, it is noted that for both arrangements (86,94), with respect to the second guideline, chemical stable materials (e.g., Pt, Au etc.) or protective materials (e.g., $SiO_2$, carbon etc.) are preferably used so that high heating temperatures can be achieved.

Heat Transfer Mechanism

The reading assembly of the present invention is based on some type of coupling between the sensor (14) and the media (24), which coupling transfers some energy to the media (24) and thus cools the temperature sensor (14). Generally, this thermal coupling can involve any kind of energy/heat involving phonons, electrons, photons, plasmons, and excitions. The mechanism for transferring the heat from the head to the media can be any kind including diffusive, conductive, convective, radiative (subsuming far-field and/or near-field) and ballistic.

In the following, some general aspects of heat transfer mechanisms are discussed: (i) The heat transfer (e.g., J. B. Lu et al. J. Appl. Phys. 76, 7209 (1994)) is generally diffusive if the mean free path of the molecules l is less than the gap d between reader and media (e.g., d>1 $\mu$m). (ii)

However, if l>d, the molecules in the junction go from the heater to the media without collisions, and transfer the heat in a ballistic way (e.g, d<1 $\mu$m). (iii) In addition, in the far-field region propagating waves can transfer radiatively power, which can be described by the Stefan-Boltzmann law. (iv) Furthermore, non-propagating waves (frustrated waves) are capable of transferring the heat when sensor (14) and media (24) are very close to each other (near-field region). From a physics point of view, the charges within the heated region are thermally excited, which can generate a significant driving field. This driving field results in a near-field, which can couple to the media in the near-field region. As near-field region, distances may be considered which are below the thermal radiation wavelength. The thermal radiation wavelength $\lambda_T$ is given by Wien's displacement law. For example, at a head temperature of 800 K, $\lambda_T$ is $\approx$4 $\mu$m, so that distances larger than $\lambda_T$ may be attributed to the far-field region while distances smaller than $\lambda_T$ may be considered as near-field region. (v) Finally, if the head is in direct contact with the media, heat is transferred via simple conduction.

In some situations, it may be preferred to optimize the heat transfer. For example, if ballistic heat flow is the dominating heat transfer mechanism, an increased pressure as well as a low molecular/atomic mass gas may be implemented. If conductive heat transfer from the head to the media is used, then the head is in contact with the media. It is preferred that the thermal resistance of this contact is as low as possible. For instance, if the contact between the head and media is realized by some lubricant, then the thermal conductivity of the lubricant should be as high as possible and the lubricant should be as thin as possible. If direct thermal conduction between head and media is used, the head may be mounted on a flexible lever which "presses" the head gently against the media. If thermal near-field coupling effects are used to transfer the heat, it is preferred that the head is in a very close distance (<5 nm) to the media.

Heat Controller

The FIG. 1 assembly (10) includes a controller (20) for the heater (16). The controller (20) comprises a capability for controlling the heat, such as a current source supply. In most cases, the heater (16) is not modulated and only turned off in a standby mode of the assembly (10). In some cases, it may be required to account for (i.e., low frequency) changes in the resistance of the heater (16) by adjusting the current by way of an active feedback loop.

Position Controller

The FIG. 1 assembly (10) includes a controller (22) for coordinating the mutual positioning of the head-like structure (12) and the media (24). It is preferred that this controller (22) functions so that the thermal coupling subsumes at least one portion of the thermal near-field. A suitable controller can use an actuator, which may be selected from the group consisting of a piezo-electric actuator, an electro-static actuator, an electro-magnetic actuator, a magnetic-strictive actuator, and a thermal-mechanical actuator.

Media

In principle, any kind of media (24) can be used. Preferably, a media is chosen which shows very large differences in a thermal coupling between bits (e.g., 1 and 0 etc.).

As an example, potential read/erase/write media phase-change materials (e.g., GaSb, InSb, GaSeTe, Ag,InSbTe etc.), as they are used in optical read-write compact discs, may be utilized. The thermal conductivity of the crystalline regions is up to 10 times larger than the regions which are amorphous. Such a difference should be enough, especially for a thermal reading method which involves simple conduction or thermal near-field effects. Experiments on thermal near-field phenomena, as well as various theories (e.g., J. B. Pendry, J. Phys.:Condens. Matter 11, 6621 (1999)) based on fluctuation-dissipation concepts, suggest that the heat transfer depends strongly on the resistivity of the media. In the case of the phase-change media, crystalline regions show up to 100 times less resistivity than amphorous regions, which should provide for enough contrast and signal/noise for high speed read/write storage applications.

Another example for such media which are based on very large resistance changes are conjugated organic materials (e.g., complex of 3-nitrobenzal malononitril and 1,4-phenylenediamine where the high impedance state has a resistivity of $10^{-8}$ $\Omega$cm reducing to $10^{-4}$ $\Omega$cm in the conductive state (Gao et al, Phys. Rev. Lett., 84 1780 (2000))). We also like to note that details of the media structure (underlayers, substrates, etc.) may be crucial. As a general guideline, for reading it may be an advantage to have a high thermal conductivity substrate in order to optimize the thermal loading of the head by the media.

A Particular Assembly of the Present Invention

Figure 5:
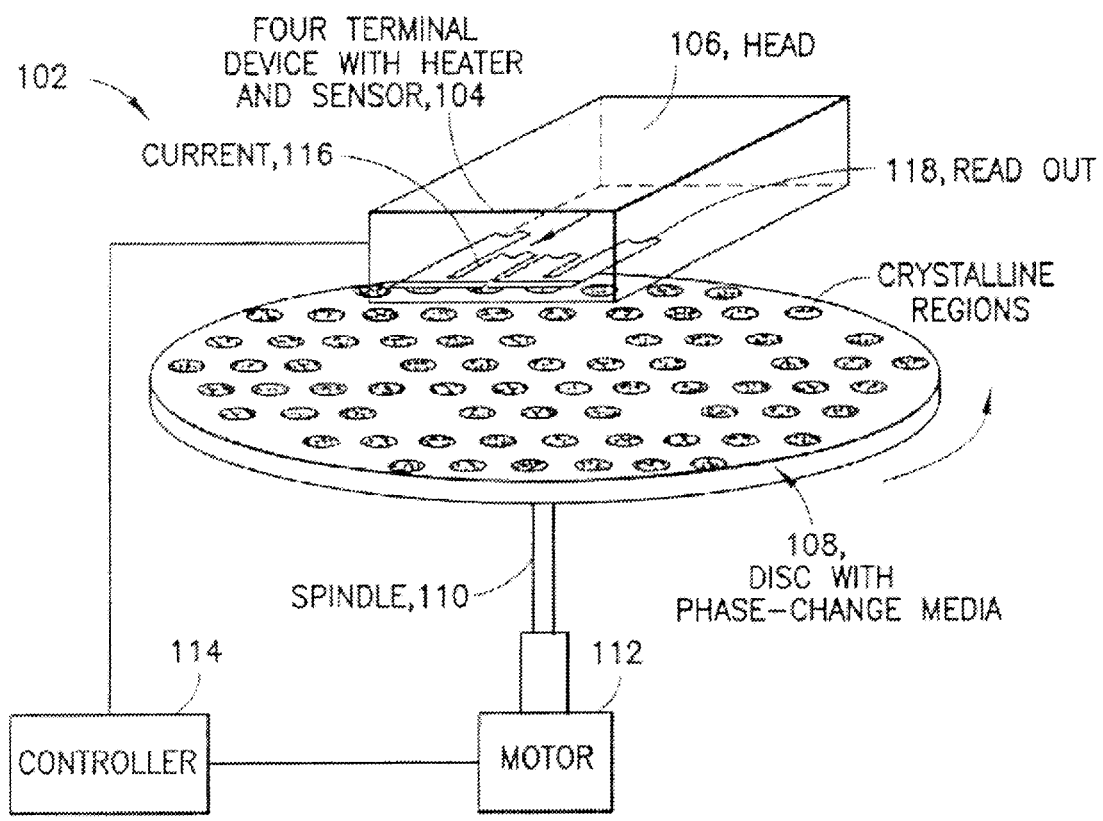
FIG. 5 shows a particular assembly of the present invention.

FIG. 5 shows a particular assembly (102) that may be built in accordance with the present disclosure. The assembly (102) includes a four terminal device (104) as outlined in the reader (see FIG. 2b) realizing the heater and temperature sensor. This sensor is embedded in a head (106) which flies via an air-bearing mechanism over a phase-change media disc (108). This disc spins using a spindle (110), a motor (112) and a controller (114), which coordinates the mutual positioning between the head (106) and the media (108) as well as controls the current (118) supplied to the four terminal device (104). The resistive temperature sensor readout signal (118) can be amplified and processed further to decode the data. Note that this resistive temperature sensor readout signal (118) typically comprises a voltage representing the temperature change of the sensor responsive to the thermal coupling between temperature sensor and the media.

What is claimed:

1. A reading assembly comprising:
   i) a head-like structure;
   ii) a temperature sensor supported by the head-like structure, the temperature sensor capable of monitoring thermal coupling between the sensor and a media;
   iii) a heater element for heating the temperature sensor; and
   iv) a controller for coordinating a mutual positioning of the head-like structure and a media.

2. An assembly according to claim 1, wherein the head-like structure comprises an air-bearing surface that can be flown over a media.

3. An assembly according to claim 1, wherein the temperature sensor comprises a thermocouple.

4. An assembly according to claim 1, wherein the temperature sensor comprises a thermistor.

5. An assembly according to claim 1, wherein the heater element comprises a resistive heater.

6. An assembly according to claim 1, wherein the heater element comprises a focused laser.

7. An assembly according to claim 1, wherein the controller for coordinating the mutual positioning of the head-like structure and a media comprises an actuator selected from the group consisting of a piezo-electric actuator, an electro-static actuator, an electro-magnetic actuator, a magnetic-strictive actuator, and a thermal-mechanical actuator.

8. An assembly according to claim 1, wherein the controller for coordinating the mutual positioning of the head-like structure and a media coordinates the mutual positioning of the incident thermal wave and a media for inducing a direct thermal coupling therebetween that subsumes at least one portion of the thermal near-field.

9. An assembly according to claim 1, further comprising a lever for mounting the head-like structure.

10. An assembly according to claim 1, further comprising a first controller comprising a current supply for input to the heater element.

11. A reading assembly comprising:
   i) a head-like structure;
   ii) a device comprising:
      a) a temperature sensor supported by the head-like structure, the temperature sensor capable of monitoring thermal coupling between the sensor and a media; and
      b) a heater element for heating the temperature sensor; and
   iii) a controller for coordinating a mutual positioning of the head-like structure and a media.

12. A reading assembly comprising:
   1) a head-like structure;
   2) a temperature sensor supported by the head-like structure;
   3) a temperature transducer supported by the head-like structure and comprising input to the temperature sensor; and
   4) a controller for coordinating a mutual positioning of the head-like structure and a media;

the assembly providing a reading capability as the temperature transducer induces a temperature differential between the media and the temperature sensor, thereby developing an information reading signal.

* * * * *